United States Patent [19]
Ikegame et al.

[11] Patent Number: 5,913,996
[45] Date of Patent: Jun. 22, 1999

[54] METHOD OF AND APPARATUS FOR FABRICATING INTERIOR ELEMENT FOR AUTOMOTIVE VEHICLE

[75] Inventors: Eisaku Ikegame; Ryoichiro Takezawa, both of Tochigi-ken, Japan

[73] Assignee: Tokyo Seat Co., Ltd., Japan

[21] Appl. No.: 08/863,754

[22] Filed: May 27, 1997

[30]     Foreign Application Priority Data

May 28, 1996  [JP]  Japan ..................................... 8-156101
May 28, 1996  [JP]  Japan ..................................... 8-156102

[51] Int. Cl.$^6$ ....................................................... B31F 1/00
[52] U.S. Cl. ........................................... 156/212; 156/285
[58] Field of Search ..................................... 156/212, 214, 156/285, 312, 475, 494, 497, 529; 264/547

[56]                References Cited

U.S. PATENT DOCUMENTS

| | | | |
|---|---|---|---|
| 3,948,708 | 4/1976 | Doerer | ................................ 156/214 X |
| 4,057,382 | 11/1977 | Yamamori . | |
| 4,243,456 | 1/1981 | Cesano | ................................... 156/214 |
| 4,555,380 | 11/1985 | Munakata et al. . | |
| 4,923,539 | 5/1990 | Spengler et al. | ..................... 156/212 X |
| 5,034,178 | 7/1991 | Kinugasa et al. | .................... 264/547 X |
| 5,840,149 | 11/1998 | Tokunaga et al. | ....................... 156/285 |

*Primary Examiner*—Michael W. Ball
*Assistant Examiner*—Shawn A. Mitchell
*Attorney, Agent, or Firm*—Dann, Dorfman, Herrell and Skillman, P.C.

[57]           ABSTRACT

A method of forming an interior element for an automotive vehicle, the interior element including a covering member and a substrate, comprising the steps of preparing a covering member for the interior element and an air-permeable substrate of a predetermined three-dimensional shape for the interior element, the covering member including a sheet of covering material and a cushioned padding, the covering sheet laminated with the cushioned padding; placing the substrate on a support for receiving and supporting the substrate thereon, the support having ventilating holes; putting the covering member, with the cushioned padding thereof facing the substrate, on a surface of the substrate carried on the support; applying vacuum to the substrate through the ventilating holes of the support to draw the covering member onto the substrate; causing a cover frame to be operatively combined with the support in a manner to contain the covering member and the substrate carried on the support; and applying compressed-air onto both surfaces of the interior element to bond the covering member onto the substrate. Also, an apparatus for forming an interior element for an automotive vehicle is disclosed.

12 Claims, 6 Drawing Sheets

METHOD OF AND APPARATUS FOR FABRICATING INTERIOR ELEMENT FOR AUTOMOTIVE VEHICLE

BACKGROUND OF THE INVENTION

1. Field of the Invention

This invention relates to a method and apparatus for fabricating an interior element for an automotive vehicle, such as a door lining, a body side lining, a seat back board or a rear tray and, more particularly, to an improved method and apparatus for forming such an interior element by previously preparing a sheet of covering material for the interior element, which is laminated with a cushioned padding on a reverse side of the covering sheet, and a substrate of a predetermined three-dimensional shape for the interior element, and bonding the covering sheet onto the substrate. For brevity of description, a method and apparatus for forming a door lining for an automotive vehicle will be referred to in the following.

2. Description of the Prior Art

In general, door lining of this type is made by bonding a sheet of covering material for a door lining onto a substrate for the door lining under suction or vacuum. As examples of a substrate for the door lining, there are employed an injection-molded plate of polypropylene resin having ventilating holes formed therein, a press-formed ligneous plate and the like. As examples of a sheet of covering material for the door lining, there are employed a sheet of covering material which is laminated with a cushioned padding of expanded polypropylene, a sheet of covering material which is laminated with a cushioned padding of expanded polyvinyl chloride, and the like.

An apparatus on which a conventional method of forming a door lining is performed includes support means for receiving and supporting a substrate for the door lining thereon, the support means having an uneven surface corresponding in shape to a surface of the substrate and ventilating holes, and air-absorbing means connected to the support means for applying vacuum or suction through the ventilating holes of the support means to the substrate carried on the surface of the support means.

When a door lining is to be formed by the conventional apparatus, a substrate having adhesive previously applied onto a surface thereof is prepared and put on the surface of the support means, and a covering sheet for the door lining is placed with a cushioned padding thereof facing the adhesive-applied surface of the substrate carried on the support means. In this condition, when the air-absorbing means is operated to apply suction to the substrate through the ventilating holes of the support means, the suction is applied to the covering sheet through ventilating holes of the substrate, thereby causing the covering sheet to be drawn onto the substrate. As a result, the covering sheet is bonded to the substrate. Thus, the door lining is vacuum-formed. When an injection-molded plate is to be utilized as the substrate, the ventilating holes are formed in the plate by mold means simultaneously with injection-molding of the plate by the mold means.

With the conventional vacuum-forming method, as suction is applied to the substrate and the covering sheet is drawn onto the substrate, the ventilating holes of the lining substrate become sealed by the cushioned padding of the covering sheet. As a result, uniform applying of suction to the entire covering sheet by the air-absorbing means will be prevented. Therefore, even though the covering sheet is drawn onto the substrate by suction, maximum suction from the air-absorbing means can not be applied to the entire surface of the covering sheet. As a result, lifting regions which are not bonded onto the lining substrate are produced at the covering sheet.

In order to prevent the producing of such lifting regions at the covering sheet, pressing of the lifting regions of the covering sheet against the lining substrate is generally performed utilizing any tool, e.g., a plug. However, when the lifting regions of the covering sheet are strongly pressed against the lining substrate by the tool in order to securely bond the lifting regions of the covering sheet to the substrate, tool marks are applied onto surfaces of the lifting regions of the covering sheet, so that the covering sheet may not be pressed with so large pressure. Therefore, it is difficult to cause the covering sheet to be uniformly bonded onto the entire surface of the lining substrate, without applying such tool marks onto the lifting regions of the covering sheet.

SUMMARY OF THE INVENTION

The present invention has been made with a view to overcoming the foregoing problem of the prior art method and apparatus.

It is therefore an object of the present invention to provide a method and apparatus for forming an interior element for an automotive vehicle which is capable of uniformly bonding a covering member for the vehicle interior element onto the entire surface of a substrate for the vehicle interior element without producing any lifting regions at the covering member.

It is another object of the present invention to provide a method and apparatus for forming an interior element for an automotive vehicle which is capable of making the interior element having a good appearance, without producing any wrinkles at and twist of a covering member of the vehicle interior element.

It is still another object of the present invention to provide a method and apparatus for forming an interior element for an automotive vehicle which is capable of easily and efficiently making the interior element.

In accordance with one aspect of the present invention, there is provided a method of forming a vehicle interior element comprising a covering member and a substrate. The vehicle interior element forming method comprises the steps of preparing a covering member for the interior element and an air-permeable substrate of a predetermined three-dimensional shape for the interior element, the covering member comprising a sheet of covering material and a cushioned padding, the covering sheet laminated with the cushioned padding; placing the substrate on support means for receiving and supporting the substrate thereon, the support means having ventilating holes; putting the covering member, with the cushioned padding thereof facing the substrate, on a surface of the substrate carried on the support means; applying vacuum to the substrate through the ventilating holes of the support means to draw the covering member onto the substrate; causing cover frame means to be operatively combined with the support means in a manner to contain the covering member and the substrate carried on the support means; and applying first compressed-air onto a surface of the covering member to bond the covering member onto the substrate, whereby the interior element can be produced.

The method may comprise the step of supporting and maintaining the covering member flat at a bonding position where the covering member is to be bonded on the substrate; and the step of causing the support means carrying the substrate thereon to be moved toward the bonding position in order to cause the covering member to be put on the substrate carried on the support means.

The step of applying first compressed-air onto a surface of the covering member to bond the covering member onto the substrate may comprise the step of applying second compressed-air to the substrate through the ventilating holes of the support means, the second compressed air balancing said first compressed-air in pressure.

The step of applying second compressed-air to the substrate may be performed simultaneously with or prior to the step of applying the first compressed-air onto the surface of the covering member.

According to a further aspect of the present invention, there is provided an apparatus for forming an interior element for an automotive vehicle. The interior element comprises a covering member and an air-permeable substrate, the covering member including a sheet of covering material and a cushioned padding, the covering sheet laminated with the cushioned padding. The interior element forming apparatus comprises support means for receiving and supporting the substrate thereon, the support means having ventilating holes; cover frame means spaced apart from the support means; means arranged between the support means and the cover frame means for supporting and maintaining the covering member flat at a bonding position where the covering member is to be bonded onto the substrate; the means for supporting and maintaining the covering member flat adapted to support the covering member in a manner to cause the cushioned padding of the covering member to face the substrate carried on the support means; first actuating means connected to the support means for causing the support means to be reciprocated between an initial position of the support means and the bonding position; second actuating means connected to the cover frame means for causing the cover frame means to be reciprocated between an initial position of the cover frame means and the bonding position; the support means and the cover frame means adapted to be operatively combined with each other at the bonding position when the support means and the cover frame means are moved to the bonding position by the first and second actuating means and arrive at the bonding position; air-absorbing means coupled to the support means for applying vacuum or suction through the ventilating holes of the support means to the substrate carried on the support means; and means coupled to the cover frame means for applying first compressed-air to the cover frame means.

The apparatus may include means for selectively applying suction and second compressed-air to the support means in lieu of the air-absorbing means, and switching means for switching an operating mode of the suction and second compressed-air applying means.

The compressed-air applying means may be provided with first pressure regulating means for regulating the first compressed-air. The suction and compressed-air applying means may be provided with second pressure regulating means for regulating the second compressed-air.

The cover frame means may include air-scattering means for scattering the first compressed-air.

The cover frame means may include trim cutting means for cutting is extra portions of terminals of the covering member off and causing the covering member to be separated from the means for supporting and maintaining the covering member flat at the bonding position.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate the same parts throughout the Figures and wherein.

DETAILED DESCRIPTION OF THE PREFERRED EMBODIMENTS

An apparatus on which a method of forming a door lining for an automotive vehicle according to the present invention may be performed will be described hereinafter with reference to the accompanying drawings. A finished product made by the method comprises a substrate and a covering member bonded on the substrate.

Figure 1:
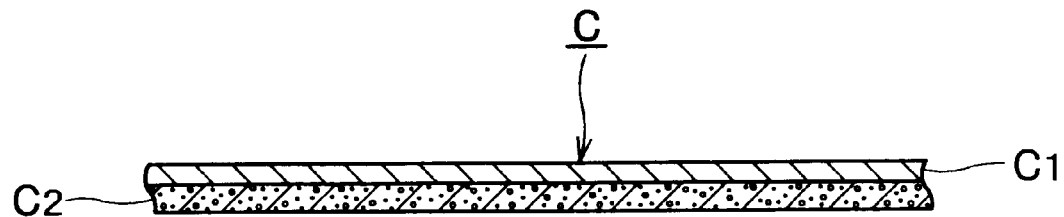
FIG. 1 is a schematic enlarged fragmentary sectional view of a covering member for an interior element which is employed in a method according to an embodiment of the present invention.

Referring now to FIG. 1, there is illustrated a covering member C for a door lining. The covering member C comprises a sheet $C_1$ of covering material and a cushioned padding $C_2$. As an example of the covering sheet $C_1$, there may be employed a sheet of a synthetic leather such as a sheet of polyvinyl chloride (PVC) or a sheet of olefinic thermoplastic elastomer (TPO). In the illustrated embodiment, a sheet of olefinic thermoplastic elastomer is employed as the covering sheet $C_1$. As an example of the cushioned padding $C_2$, there may be employed a cushioned padding of expanded polypropylene, a cushioned padding of expanded polyvinyl chloride or the like. The covering member C is previously made by causing the covering sheet $C_1$ to be laminated with the cushioned padding $C_2$ on a reverse side of the covering sheet $C_1$.

Figure 2:
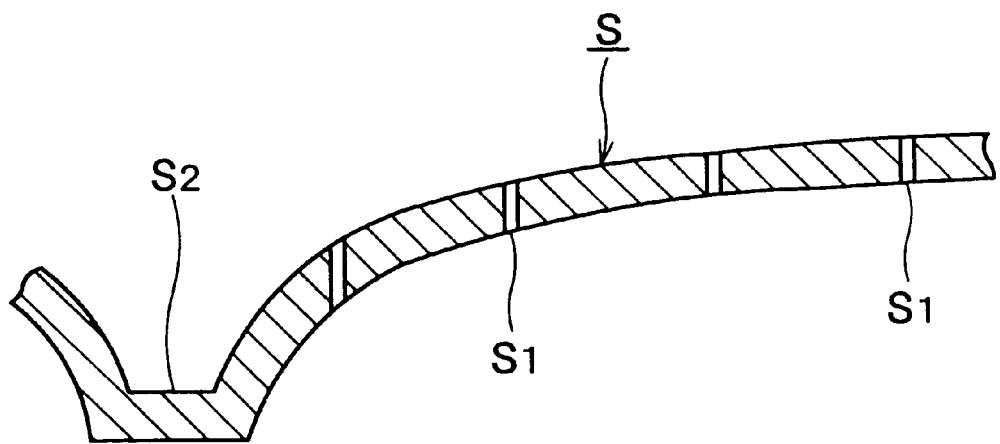
FIG. 2 is a schematic enlarged fragmentary sectional view of a substrate for the interior element which is employed in the method of the present invention.

Referring to FIG. 2, there is illustrated an air-permeable substrate S for the door lining. On a surface of the substrate S, any suitable adhesive such as an adhesive of chloroprene rubber or an adhesive of urethane resin is previously applied. As an example of the door lining substrate S, there may be employed an injection-molded plate of polypropylene resin or a press-formed ligneous plate. The door lining substrate S is previously formed into a predetermined three-dimensional shape. In the illustrated example, an injection-molded substrate S is employed. When the substrate S is made by injection-molding which is performed utilizing any suitable mold means, a plurality of ventilating holes $S_1$ are simultaneously formed in the substrate S by the mold means. Each of the ventilating holes $S_1$ penetrates the substrate S and extends in a thickness direction of the substrate S. In the event that a press-formed ligneous substrate is to be employed in the method of the present invention, the substrate can be used as it is since the ligneous substrate inherently has an aerenchyma including a plurality of ventilating holes.

Incidentally, a center padding of any suitable material may be bonded on a predetermined area of a surface of the covering member C bonded on the substrate S as will be discussed in greater detail hereinafter. In this case, recess portions $S_2$ (only one is shown in FIG. 2) may be previously formed at predetermined regions of the substrate S in a manner to be swelled in a thickness direction thereof or downwardly from the surface of the substrate S. When the covering member C is put on the substrate and portions of the covering member C which positionally correspond to the recess portions $S_2$ of the substrate S are pressed by pusher bars as will be discussed in greater detail hereinafter, the portions of the covering member C are adapted to be pressed into the recess portions $S_2$ of the substrate S so as to be caved. Thereafter, the center padding can be bonded on the predetermined area of the covering member C with terminal portions thereof being received in the caved portions of the covering member C bonded to the substrate S. Incidentally, on inner surfaces of the recess portions $S_2$, adhesives are previously applied.

Figure 3:
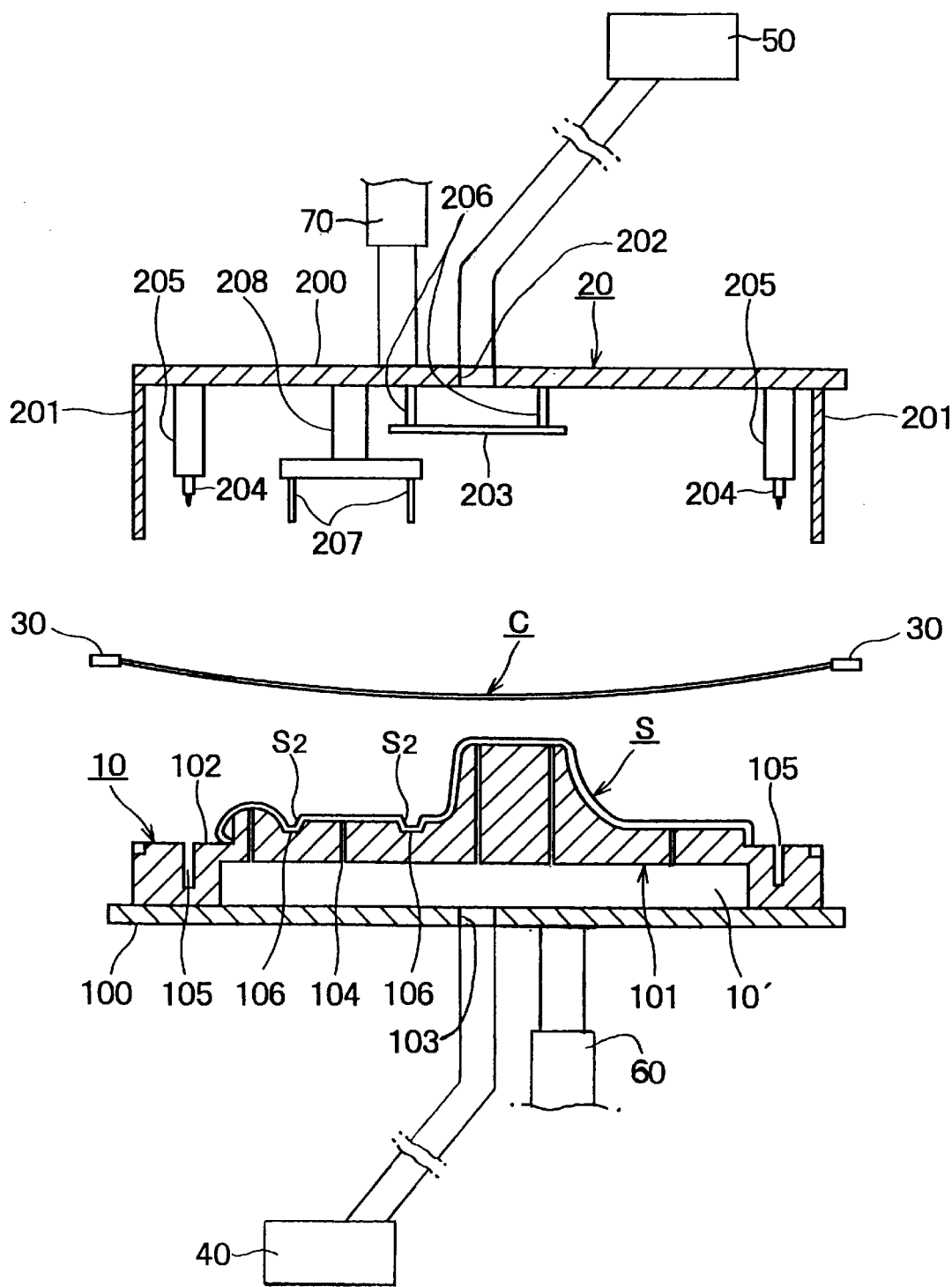
FIG. 3 is a schematic front view of an apparatus for performing the method of the present invention for making the interior element.

Referring to FIG. 3, description will be made at first of an apparatus for forming a door lining according to an embodiment of the present invention. The apparatus generally includes support means 10 for receiving and supporting the lining substrate S thereon, cover frame means 20 spaced apart from the support means 10, air-absorbing means 40 for applying vacuum or suction to the support means 10, means 50 for appplying compressed-air to the cover frame means 20, and means 30 arranged between the support means 10 and the cover frame means 20 for supporting and maintaining the covering member C flat at a position where the covering member C is to be bonded onto the substrate S (hereinafter referred to as "bonding position"). In the illustrated embodiment, the means 30 for supporting and maintaining the covering member C flat at the bonding position comprises jigs, e.g. clamps which are adapted to clamp terminal portions of the covering member C. As the air-absorbing means 40, there may be employed any suitable vacuum pump. As the compressed-air applying means 50, there may be used any suitable air compressor.

The support means 10 comprises a base plate 100 and a hollow body 101 mounted on the base plate 100. The hollow body 101 has an uneven surface 102 on which the substrate S is to be put. The uneven surface 102 of the hollow body 101 has a shape substantially corresponding to that of the surface of the substrate S. The support means 10 is adapted to be reciprocated between an initial position thereof and the bonding position by first actuating means 60 connected to the support means 10. As the first actuating means 60, there may employed any suitable hydraulic or pneumatic cylinder. The base plate 100 of the support means 10 has a connection hole 103 to which the air-absorbing means 40 is coupled. The hollow body 101 of the support means 10 has a plurality of ventilating holes 104 formed in the unevenly surfaced portion 102 thereof and communicating between the exterior of the support means 10 and a hollow portion 10' of the support means 10.

The cover frame means 20 has a bottomless box-like structure which comprises a top plate section 200 and a side wall section 201. Like the support means 10, the cover frame means 20 is adapted to be reciprocated between an initial position thereof and the bonding position by second actuating means 70 connected to said cover frame means. As the second actuating means 70, there may be employed any suitable hydraulic or pneumatic cylinder. The top plate section 200 has a connection hole 202 to which the compressed-air applying means 50 is coupled. The cover frame means 20 may include an air-scattering plate 203 provided in the interior of the cover frame means 20 for scattering compressed-air from the compressed-air applying means 50, and trim cutting means 204 provided in the interior of the cover frame means 20 for cutting extra portions of terminals of the covering member C off, the trim cutting means 204 being adapted to be actuated by any suitable driving means 205, e.g., driving cylinders. More particularly, the air-scattering plate 203 is provided in the interior of the cover frame means 20 in a manner to face the connection hole 202 of the cover frame means 20 and supported to supports 206 hanging downwardly from the top plate section 200. The trim cutting means 204 are supported to heads of the driving cylinders 205 hanging downwardly from the top plate section 200. In a case where the cover frame means 20 includes the trim cutting means 204, first grooves 105 are provided in the unevenly surfaced portion 102 of the hollow body 101 of the support means 10. After the support means 10 and the cover frame means 20 are moved to the bonding position by the actuating means 60, 70 and bonding of the covering member C onto the substrate S is completed by the support means 10 and the cover frame means 20 as will be discussed in greater detail hereinafter, the trim cutting means 204 are actuated by the driving cylinders 205, whereby cutting edges of the trim cutting means 204 are adapted to cut the extra portions of the terminals of the covering member C off while entering the first grooves 105 of the support means 10. In the event that the center padding briefly described above is to be bonded onto a predetermined area of the covering member C bonded to the substrate S, puhser bars 207 may be provided in the interior of the cover frame means 20. Bearing on this, second grooves 106 are provided in the unevenly surfaced portion 102 of the hollow body 101 of the support means 10. When the substrate S is carried on the unevenly surfaced portion 102 of the hollow body 101 of the support means 10, the downwardly swelled recess portions $S_2$ of the substrate S which are briefly described above are adapted to be received in the second grooves 106 of the support means 10. The pusher bars 207 are supported to a support 208 hanging downwardly from the top plate section 200. When the support means 10 and the cover frame means 20 are moved toward the bonding position by the actuating means 60, 70 and arrive at the bonding position, tip ends of the pusher bars 207 are adapted to press regions of the covering member C against inner surfaces of the downwardly swelled recess portions $S_2$ of the substrate S while pressing the regions of the covering member C into the downwardly swelled recess portions $S_2$ of the substrate S.

Now, the manner of operation of the door lining forming apparatus constructed as described above will be discussed hereinafter with reference to FIGS. 3 to 6.

Figure 4:
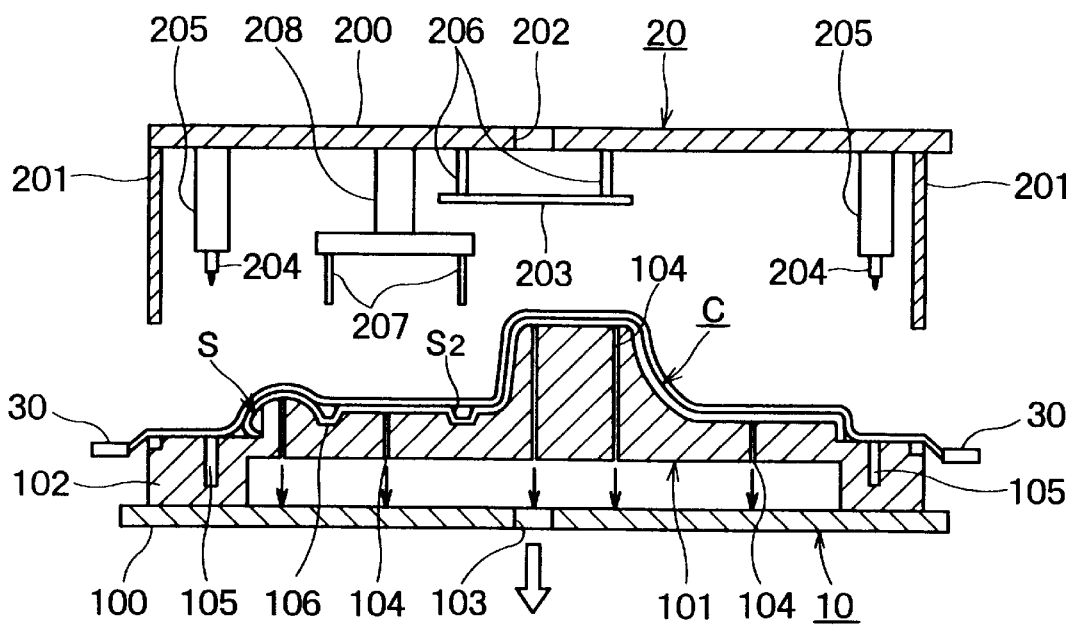
FIGS. 4–6 are each a schematic front view of the apparatus of FIG. 3 and of assistance in explaining the interior element forming method.

When forming of a door lining is to be performed, the covering member C is heated to soften and is clamped at the terminal portions thereof by the clamps 30 with the cushioned padding $C_2$ thereof (see FIG. 1) facing downwardly, whereby the covering member S is extended in a flat form and maintained flat through the clamps 30. The substrate C is put on the uneven surface 102 of the support means 10 as shown in FIG. 3. In this condition, the support means 10 carrying the substrate S thereon is moved upwardly by the first actuating means 60 and arrives at the bonding position as shown in FIG. 4, resulting in the substrate S coming into contact with and being covered by the covering member C which has been maintained flat at the bonding position by the clamps 30. Thus, covering of the substrate S by the covering member C is simply performed without producing any wrinkle at the covering member C and twist of the covering member C.

After the substrate S is covered by the covering member C, the air-absorbing means 40 coupled to the support means 10 is operated to apply vacuum or suction through the ventilating holes 104 of the support means 10 to the substrate S carried on the support means 10. When suction is applied to the substrate S by the air-absorbing means 40, the suction is applied to the covering member C through the ventilating holes $S_1$ of the substrate S (see FIG. 2), resulting in the covering member C being drawn onto the substrate S under suction and being bonded onto the substrate S.

Figure 5:
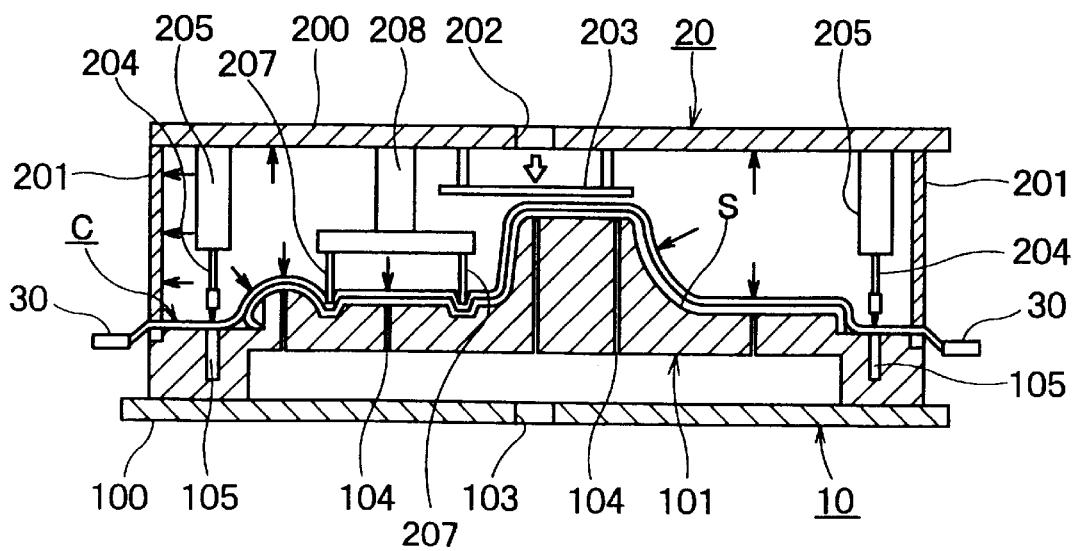

Just before or after the applying of suction is finished, the cover frame means 20 is moved downwardly by the second actuating means 70 and is operatively combined with the support means 10 so as to contain a combination of the covering member C and substrate S as shown in FIG. 5. At this time, the interior of the combination of the cover frame means 20 and support means 10 is hermetically sealed. The downward movement of the cover frame means 20 by the second actuating means 70 causes the pusher bars 207 to be moved downwardly. When the pusher bars 207 are moved downwardly, regions of the covering member C are pressed into the recess portions $S_2$ of the substrate S so as to be caved by the tip ends of the pusher bars 207. Thus, the regions of the covering member C are securely bonded onto inner surfaces of the recess portions $S_2$ of the substrate S.

In state where the support means 10 and the cover frame means 20 are combined with each other, the compressed-air applying means 50 coupled to the cover frame means 20 through the connection hole 202 as discussed above is operated, thereby applying compressed-air into the interior of the combination of the support means 10 and cover frame means 20. Since the interior of the combination of the support means 10 and cover frame means 20 is in a hermetically sealed condition as described above, compressed-air from the compressed-air applying means 50 is uniformly imparted onto the surface of the covering member C, thereby causing the covering member C to be uniformly bonded onto the entire surface of the substrate S. Therefore, even though there are any lifting regions of the covering member C which were unable to be bonded onto the substrate S during the applying of suction to the covering member C and substrate S, such lifting regions of the covering member C can be securely bonded onto the substrate S by the applying of compressed-air to the covering member C bonded to the substrate S.

Figure 6:
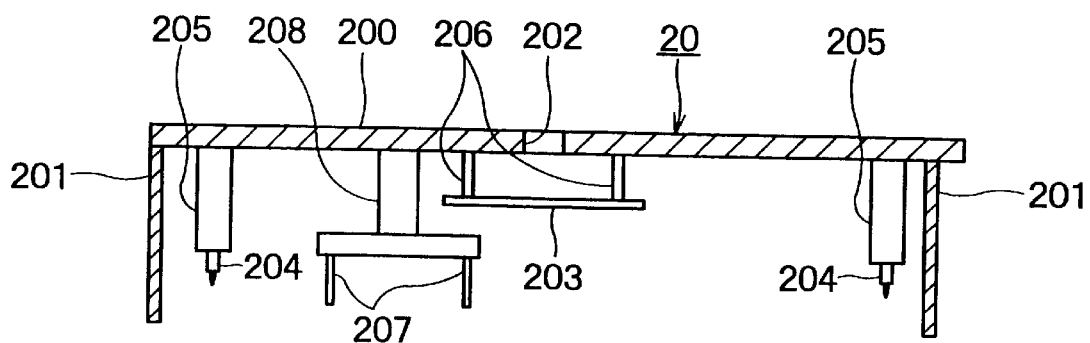
Figure 6:
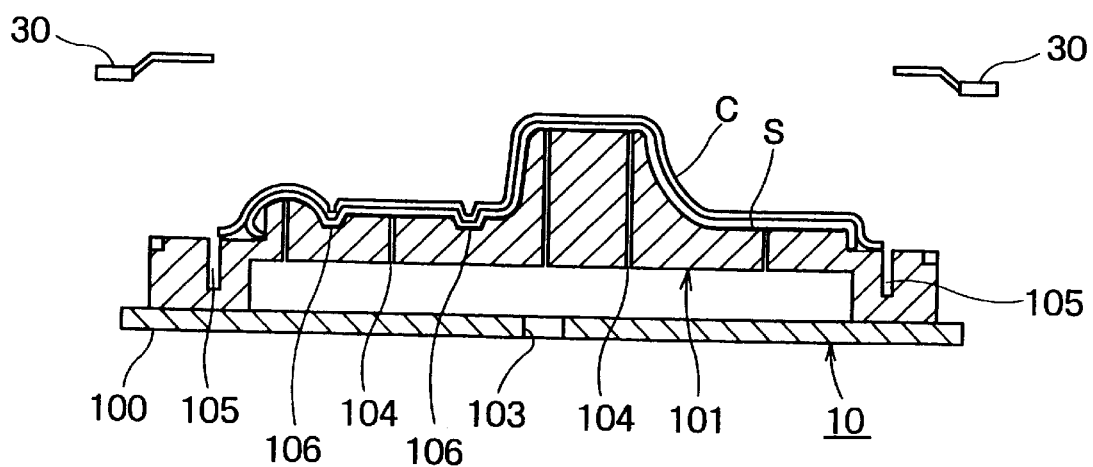

After the applying of compressed-air is completed, the driving cylinders 205 are actuated, whereby the trim cutting means 204 are moved downwardly toward an assembly of the covering member C and substrate S to cut the extra portions of the terminals of the covering member C off. As a result, the covering member C is separated from the clamps 30. Then, the support means 10 and the cover frame means 20 are actuated by the first and second actuating means 60, 70 and returned to the initial positions thereof as shown in FIG. 6. Simultaneously, the assembly of the covering member C and substrate S is moved to the initial position of the support means 10 while being carried on the support means 10. Ultimately, the assembly of the covering member C and substrate S can be removed as a finished door lining product from the support means 10.

Incidentally, in the event that the center padding is to be bonded onto the predetermined area of the covering member C bonded to the substrate S, bonding of the center padding can be performed by applying any suitable adhesive onto the predetermined area of the covering member C bonded to the substrate S, placing the center padding on the predetermined area of the covering member C and pressing the center padding against the predetermined area of the covering member C while pressing terminal portions of the center padding into the caved regions of the covering member C which has been pressed into the recess portions $S_2$ of the substrate S by the pusher bars 207 as described above. Thus, the center padding can be securely bonded on the predetermined area of the surface of the covering member C bonded to the substrate S.

Figure 7:
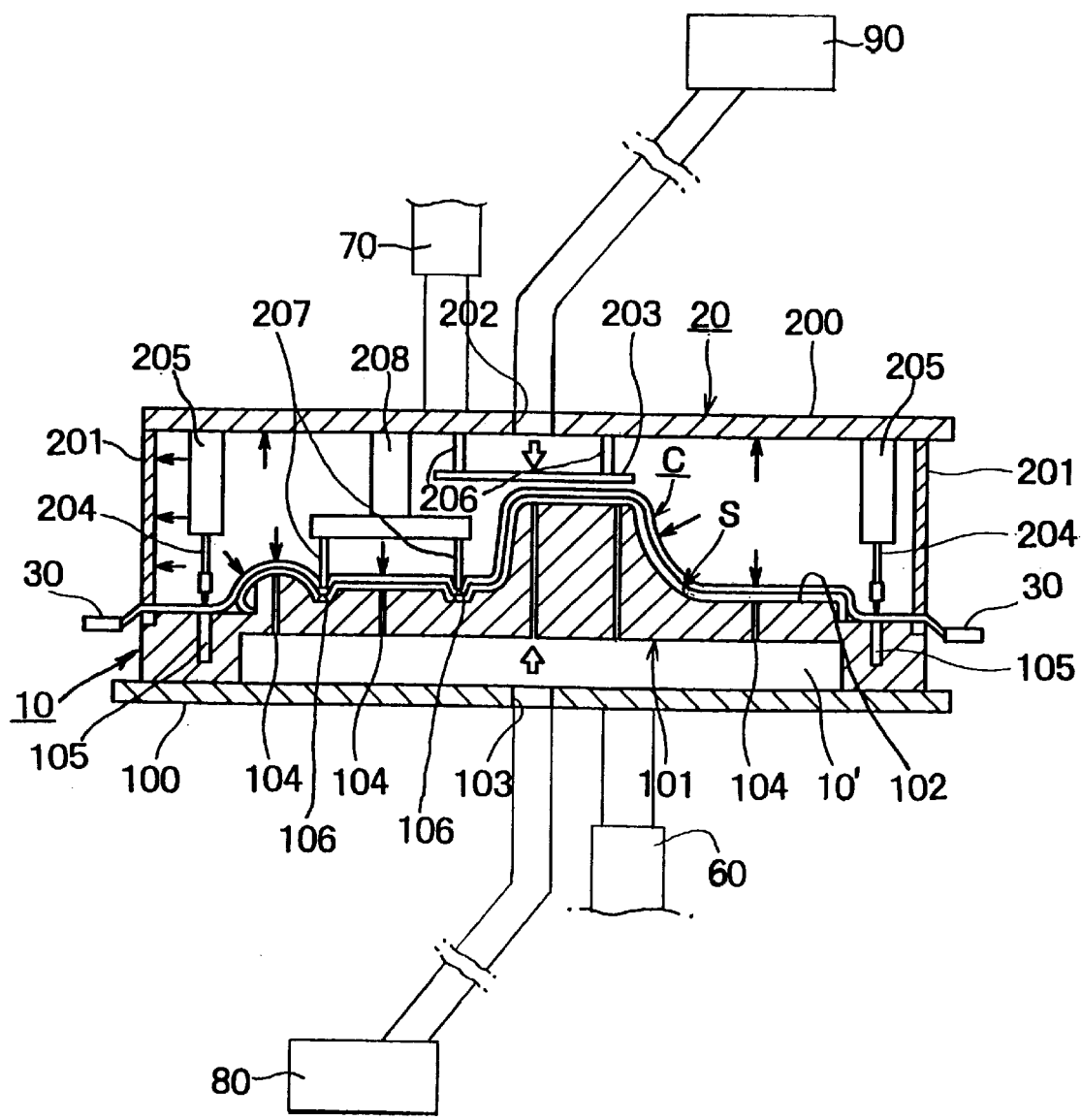
FIG. 7 is a schematic front view of a modification of the apparatus of FIG. 3.

Referring to FIG. 7, description will be made of a modification of the door lining forming apparatus shown in FIGS. 3–6. This modification is substantially similar to that of FIGS. 3–6 except that the modification includes means 80 for selectively applying suction and compressed-air to the support means 10 in lieu of the air-absorbing means of the embodiment shown in FIGS. 3–6. In FIG. 7, components which are identical to those shown in FIGS. 3–6 are denoted by the same designators and the description of them will not be repeated. FIG. 7 illustrates a situation in which the cover frame means 20 and the support means 10 are operatively combined with each other.

The means 80 for selectively applying suction and compressed-air is coupled to the support means 10 through the connection hole 103 of the base plate 100 of the support means 10 and provided with any suitable switching means (not shown) for switching an operating mode of the suction and compressed-air applying means. In this modification, a first compressed-air is adapted to be applied onto the covering member on the substrate S by compressed-air applying means 90, e.g., an air compressor, coupled to the cover frame means 20 through the connection hole 202 of the cover frame means 20, and a second compressed-air is adapted to be applied to the substrate S by the suction and compressed-air applying means 80 coupled to the support means 10. The compressed-air applying means 90 coupled to the cover frame 20 and the suction and compressed-air applying means 80 coupled to the support means 10 are provided with first pressure regulating means (not shown) and second pressure regulating means (not shown), respectively. The first compressed-air from the compressed-air applying means 90 coupled to the cover frame means 20 and the second compressed-air from the suction and compressed-air applying means 80 coupled to the support means 10 are adapted to be controlled by the first and second pressure regulating means.

In a situation where the substrate S carried on the support means 10 is covered by the covering member C at the bonding position, the substrate S covered with the covering member C is subjected to suction from the suction and compressed air applying means 80, whereby the covering member C is drawn onto the substrate S and bonded onto the substrate S. Just before or after the applying of suction to the substrate S covered with the covering member C is finished, the cover frame means 20 is moved downwardly by the second actuating means 70 and is operatively combined with the support means 10 at the bonding position so as to contain therein a combination of the covering member C and substrate S as shown in FIG. 7. In this condition, the compressed-air applying means 90 coupled to the cover frame means 20 through the connection hole 202 is operated, thereby applying the first compressed-air into the interior of the combination of the support means 10 and cover frame means 20. Thus, the covering member C is uniformly pressed against the entire surface of the substrate S by the first compressed-air from the compressed-air applying means 90.

Figure 8:
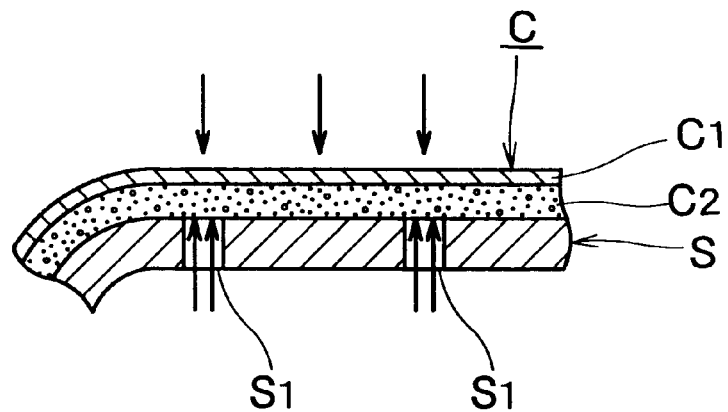
FIG. 8 is a schematic enlarged fragmentary sectional view of a combination of a covering member and substrate, wherein the combination is subjected to first and second compressed-airs by the modification of FIG. 7.
Figure 9:
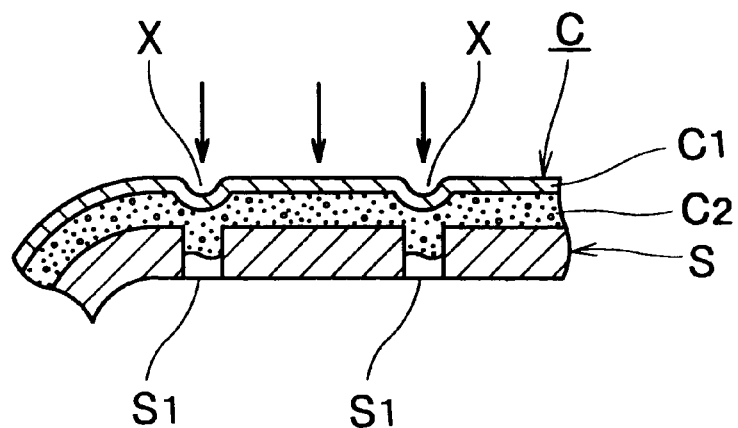
FIG. 9 is a schematic enlarged fragmentary sectional view of the combination of the covering member and substrate, and of assistance in explaining a problem which will be brought about when pressure of the first compressed-air is larger than that of the second compressed-air.

Simultaneously with or just before the applying of the first compressed-air to the combination of the covering member C and substrate S, the operating mode of the suction and compressed-air applying means 80 to apply suction is changed by the switching means to a mode of applying second compressed-air, whereby the suction and compressed-air applying means 80 applies to the combination of the substrate S and covering member C the second compressed-air which balances the first compressed-air in pressure as shown in FIG. 8. If the pressure of the first compressed-air from the compressed-air applying means 90 is greater than that of the second compressed-air from the suction and compressed-air applying means 80, regions X of the covering member C which positionally correspond to the ventilating holes $S_1$ of the substrate S may be drawn into the ventilating holes $S_1$ of the substrate S and depressed as shown in FIG. 9 during the applying of the first and second compressed-airs. As a result, the as-depressed regions X appear on a surface of a finished product. In order to avoid this problem, the pressure of the first compressed-air and the pressure of the second compressed-air are adapted to be controlled by the first and second pressure regulating means in a manner to balance each other. Even though the substrate S has any undercut portions and/or a deep drawing form, if the pressure of the first compressed-air and the pressure of the second compressed-air are increased by the first and second pressure regulating means, the covering member C can be completely bonded onto such substrate S.

While the above description is made of the apparatus which forms a door lining, the application of the present invention is not limited to such apparatus and the present invention may be applied to an apparatus which forms vehicle interior elements such as a body side lining, a seat back board, a rear tray and the like.

The terms and expressions which have been employed are used as terms of description and not of limitation, and there is no intention in the use of such terms and expression of excluding any equivalents of the features shown and described, or portions thereof, but it is recognized that various modifications are possible within the scope of the invention claimed.

What is claimed is:

1. A method of forming an interior element for an automotive vehicle, said interior element comprising a covering member and a substrate, said method comprising the steps of:

a. preparing a covering member for said interior element and an air-permeable substrate having a performed three-dimensional shape for said interior element, said covering member comprising a sheet of covering material and a cushioned padding, said sheet of covering material laminated with said cushioned padding;

b. placing said substrate on a support means for receiving and supporting said substrate thereon, said support means having ventilating holes;

c. putting said covering member on said substrate carried on said support means such that said cushioned padding is facing said substrate;

d. applying vacuum to said substrate through said ventilating holes of said support means to draw said covering member onto said substrate;

e. causing a cover frame means to be operatively combined with said support means in a manner to contain said covering member and said substrate carried on said support means;

f. applying first compressed-air onto a surface of said covering member facing away from said substrate to bond said covering member onto said substrate; and g. applying second compressed-air to said substrate through said ventilating holes of said support means, said second compressed-air balancing said first compressed-air in pressure.

2. A method of forming an interior element for an automotive vehicle as defined in claim 1, further comprising the step of supporting and maintaining said covering member flat at a bonding position where said covering member is to be bonded on said substrate; and the step of causing said support means carrying said substrate thereon to be moved toward said bonding position in order to cause said covering member to be put on said substrate carried on said support means.

3. A method of forming an interior element for an automotive vehicle as defined in claim 1 or 2, wherein said step of applying second compressed-air to said substrate is performed simultaneously with or prior to said step of applying first compressed-air onto said surface of said covering member.

4. A method of forming an interior element for an automotive vehicle as defined in claim 1, wherein said steps (d) and (g) are performed by means for selectively applying said vacuum and second compressed-air to said substrate, said vacuum and second compressed-air applying means being provided with switching means for switching an operating mode of said vacuum and second compressed-air applying means.

5. A method of forming an interior element for an automotive vehicle as defined in claim 2, wherein said steps (d) and (g) are performed by means for selectively applying said vacuum and second compressed-air to said substrate, said vacuum and second compressed-air applying means being provided with switching means for switching an operating mode of said vacuum and second compressed-air applying means.

6. A method of forming an interior element for an automotive vehicle as defined in claim 3, wherein said steps (d) and (g) are performed by means for selectively applying said vacuum and second compressed-air to said substrate, said vacuum and second compressed-air applying means being provided with switching means for switching an operating mode of said vacuum and second compressed-air applying means.

7. A method of forming an interior element for an automotive vehicle as defined in claim 1, wherein said step (f) includes the step of scattering said first compressed-air.

8. A method of forming an interior element for an automotive vehicle as defined in claim 2, wherein said step (f) includes the step of scattering said first compressed-air.

9. A method of forming an interior element for an automotive vehicle as defined in claim 3, wherein said step (f) includes the step of scattering said first compressed-air.

10. A method of forming an interior element for an automotive vehicle as defined in claim 4, wherein said step (f) includes the step of scattering said first compressed-air.

11. A method of forming an interior element for an automotive vehicle as defined in claim 5, wherein said step (f) includes the step of scattering said first compressed-air.

12. A method of forming an interior element for an automotive vehicle as defined in claim 6, wherein said step (f) includes the step of scattering said first compressed-air.

* * * * *